US008812701B2

(12) United States Patent
Etchegoyen et al.

(10) Patent No.: US 8,812,701 B2
(45) Date of Patent: Aug. 19, 2014

(54) DEVICE AND METHOD FOR SECURED COMMUNICATION

(75) Inventors: Craig S. Etchegoyen, Irvine, CA (US); Dono Harjanto, Irvine, CA (US); Bradley C. Davis, Irvine, CA (US)

(73) Assignee: Uniloc Luxembourg, S.A., Luxembourg (LU)

( * ) Notice: Subject to any disclaimer, the term of this patent is extended or adjusted under 35 U.S.C. 154(b) by 257 days.

(21) Appl. No.: 12/468,288

(22) Filed: May 19, 2009

(65) Prior Publication Data

US 2009/0292816 A1 Nov. 26, 2009

Related U.S. Application Data

(60) Provisional application No. 61/055,129, filed on May 21, 2008.

(51) Int. Cl.
*G06F 15/16* (2006.01)

(52) U.S. Cl.
USPC ........... 709/229; 709/203; 709/219; 713/150; 726/29

(58) Field of Classification Search
USPC ............ 709/229, 203, 219; 713/150, 15, 186, 713/194; 726/26, 29
See application file for complete search history.

(56) References Cited

U.S. PATENT DOCUMENTS

| 4,351,982 | A | 9/1982 | Miller et al. |
| 4,658,093 | A | 4/1987 | Hellman |
| 4,704,610 | A | 11/1987 | Smith et al. |
| 4,796,220 | A | 1/1989 | Wolfe |
| 5,210,795 | A | 5/1993 | Lipner et al. |
| 5,291,598 | A | 3/1994 | Grundy |
| 5,414,269 | A | 5/1995 | Takahashi |
| 5,418,854 | A | 5/1995 | Kaufman et al. |
| 5,440,635 | A | 8/1995 | Bellovin et al. |
| 5,490,216 | A * | 2/1996 | Richardson, III ............... 705/59 |
| 5,666,415 | A | 9/1997 | Kaufman |
| 5,745,879 | A | 4/1998 | Wyman |

(Continued)

FOREIGN PATENT DOCUMENTS

| AU | 678985 | 6/1997 |
| EP | 1 202 494 | 5/2002 |

(Continued)

OTHER PUBLICATIONS

Franklin, Jason, Damon McCoy, Parisa Tabriz, Vicentiu Neagoe, Jamie V. Randwyk, and Douglas Sicker. "Passive data link layer 802.11 wireless device driver fingerprinting." In Proc. 15th USENIX Security Symposium, pp. 167-178. 2006.*

(Continued)

*Primary Examiner* — Jimmy H Tran
(74) *Attorney, Agent, or Firm* — Sean D. Burdick

(57) ABSTRACT

Devices and methods are provided for securing communication between a traffic management center (TMC) and a traffic controller via utilization of a field security device. In one embodiment, the field security device transmits a device identifier to the TMC upon being powered up or connected to the traffic controller. The device identifier is generally based on a combination of user-configurable and non-user-configurable parameters of the field security device. In response to the TMC authenticating the device identifier, the field security device establishes a secure private network (SPN) between the field security device and the TMC.

32 Claims, 8 Drawing Sheets

(56) References Cited

U.S. PATENT DOCUMENTS

| | | |
|---|---|---|
| 5,754,763 A | 5/1998 | Bereiter |
| 5,790,664 A | 8/1998 | Coley et al. |
| 5,852,724 A | 12/1998 | Glenn, II et al. |
| 5,925,127 A | 7/1999 | Ahmad |
| 5,974,150 A | 10/1999 | Kaish et al. |
| 6,009,401 A | 12/1999 | Horstmann |
| 6,044,471 A | 3/2000 | Colvin |
| 6,158,005 A | 12/2000 | Bharathan et al. |
| 6,173,311 B1 | 1/2001 | Hassett et al. |
| 6,202,170 B1 | 3/2001 | Busschbach et al. |
| 6,230,199 B1 | 5/2001 | Revashetti et al. |
| 6,233,567 B1 | 5/2001 | Cohen |
| 6,243,468 B1 | 6/2001 | Pearce et al. |
| 6,243,469 B1 | 6/2001 | Kataoka et al. |
| 6,294,793 B1 | 9/2001 | Brunfeld et al. |
| 6,330,670 B1 | 12/2001 | England et al. |
| 6,449,645 B1 | 9/2002 | Nash |
| 6,463,078 B1 | 10/2002 | Engstrom et al. |
| 6,536,005 B1 | 3/2003 | Augarten |
| 6,785,825 B2 | 8/2004 | Colvin |
| 6,804,257 B1 | 10/2004 | Benayoun et al. |
| 6,826,690 B1 * | 11/2004 | Hind et al. .................... 713/186 |
| 6,859,793 B1 | 2/2005 | Lambiase |
| 6,868,083 B2 | 3/2005 | Apostolopous et al. |
| 6,920,567 B1 | 7/2005 | Doherty et al. |
| 6,940,422 B1 | 9/2005 | Bachelder et al. |
| 6,967,592 B2 | 11/2005 | Bell et al. |
| 6,976,009 B2 | 12/2005 | Tadayon et al. |
| 7,032,110 B1 | 4/2006 | Su et al. |
| 7,069,440 B2 | 6/2006 | Aull |
| 7,069,595 B2 | 6/2006 | Cognigni et al. |
| 7,085,741 B2 | 8/2006 | Lao et al. |
| 7,117,526 B1 | 10/2006 | Short |
| 7,181,195 B2 * | 2/2007 | Booth et al. .................. 455/411 |
| 7,188,241 B2 | 3/2007 | Cronce et al. |
| 7,203,966 B2 | 4/2007 | Abburi et al. |
| 7,206,765 B2 | 4/2007 | Gilliam et al. |
| 7,272,728 B2 * | 9/2007 | Pierson et al. ................ 713/194 |
| 7,310,813 B2 | 12/2007 | Lin et al. |
| 7,319,987 B1 | 1/2008 | Hoffman et al. |
| 7,327,280 B2 | 2/2008 | Bachelder et al. |
| 7,337,147 B2 | 2/2008 | Chen et al. |
| 7,343,297 B2 | 3/2008 | Bergler et al. |
| 7,463,945 B2 | 12/2008 | Kiesel et al. |
| 7,653,899 B1 | 1/2010 | Lindahl et al. |
| 7,698,416 B2 | 4/2010 | Potti et al. |
| 7,765,328 B2 | 7/2010 | Bryers et al. |
| 7,836,121 B2 * | 11/2010 | Elgressy et al. .............. 709/203 |
| 8,249,028 B2 * | 8/2012 | Porras et al. .................. 370/335 |
| 2001/0034712 A1 | 10/2001 | Colvin |
| 2001/0044782 A1 | 11/2001 | Hughes et al. |
| 2002/0019814 A1 | 2/2002 | Ganesan |
| 2002/0066041 A1 * | 5/2002 | Lemke .......................... 713/202 |
| 2002/0082997 A1 | 6/2002 | Kobata et al. |
| 2002/0091937 A1 | 7/2002 | Ortiz |
| 2002/0112186 A1 | 8/2002 | Ford et al. |
| 2002/0161718 A1 | 10/2002 | Coley et al. |
| 2003/0008668 A1 * | 1/2003 | Perez-Breva et al. ......... 455/456 |
| 2003/0033541 A1 | 2/2003 | Edmark et al. |
| 2003/0056107 A1 * | 3/2003 | Cammack et al. ............. 713/189 |
| 2003/0059049 A1 * | 3/2003 | Mihm et al. ................... 380/270 |
| 2003/0065918 A1 | 4/2003 | Willey |
| 2003/0097562 A1 * | 5/2003 | Wheeler et al. ............... 713/168 |
| 2003/0126240 A1 | 7/2003 | Vosseler |
| 2003/0163734 A1 | 8/2003 | Yoshimura et al. |
| 2003/0172035 A1 | 9/2003 | Cronce et al. |
| 2003/0188001 A1 | 10/2003 | Eisenberg et al. |
| 2003/0217289 A1 | 11/2003 | Ammon et al. |
| 2003/0236880 A1 | 12/2003 | Srivastava et al. |
| 2004/0024860 A1 | 2/2004 | Sato et al. |
| 2004/0030901 A1 * | 2/2004 | Wheeler et al. ............... 713/176 |
| 2004/0030912 A1 | 2/2004 | Merkle et al. |
| 2004/0054569 A1 | 3/2004 | Pombo et al. |
| 2004/0059929 A1 | 3/2004 | Rodgers et al. |
| 2004/0107219 A1 * | 6/2004 | Rosenberger ............. 707/104.1 |
| 2004/0143746 A1 | 7/2004 | Ligeti et al. |
| 2004/0148397 A1 | 7/2004 | Aronoff et al. |
| 2004/0166818 A1 * | 8/2004 | Karlsson .................... 455/115.1 |
| 2004/0172558 A1 | 9/2004 | Callahan et al. |
| 2004/0187018 A1 | 9/2004 | Owen et al. |
| 2004/0196162 A1 * | 10/2004 | Brooke ......................... 340/906 |
| 2005/0033957 A1 * | 2/2005 | Enokida ........................ 713/156 |
| 2005/0050531 A1 * | 3/2005 | Lee ................................ 717/153 |
| 2005/0055552 A1 | 3/2005 | Shigeeda |
| 2005/0097204 A1 | 5/2005 | Horowitz et al. |
| 2005/0108173 A1 | 5/2005 | Stefik et al. |
| 2005/0138155 A1 | 6/2005 | Lewis |
| 2005/0172161 A1 | 8/2005 | DeLaCruz et al. |
| 2005/0172280 A1 | 8/2005 | Ziegler et al. |
| 2005/0192832 A1 | 9/2005 | Call et al. |
| 2005/0264431 A1 | 12/2005 | Bachelder |
| 2006/0026442 A1 | 2/2006 | Ittogi |
| 2006/0072444 A1 | 4/2006 | Engel et al. |
| 2006/0080534 A1 * | 4/2006 | Yeap et al. ..................... 713/176 |
| 2006/0095199 A1 * | 5/2006 | Lagassey ...................... 701/117 |
| 2006/0095454 A1 | 5/2006 | Shankar et al. |
| 2006/0130135 A1 * | 6/2006 | Krstulich et al. ................ 726/15 |
| 2006/0161914 A1 | 7/2006 | Morrison et al. |
| 2006/0166656 A1 | 7/2006 | Klicpera et al. |
| 2006/0181394 A1 * | 8/2006 | Clarke ......................... 340/10.4 |
| 2006/0230317 A1 * | 10/2006 | Anderson ........................ 714/38 |
| 2006/0265337 A1 | 11/2006 | Wesinger |
| 2006/0265446 A1 * | 11/2006 | Elgressy et al. .............. 709/200 |
| 2006/0265758 A1 | 11/2006 | Khandelwai et al. |
| 2006/0277596 A1 | 12/2006 | Calvert et al. |
| 2006/0282511 A1 | 12/2006 | Takano et al. |
| 2007/0025245 A1 * | 2/2007 | Porras et al. ................... 370/229 |
| 2007/0025265 A1 * | 2/2007 | Porras et al. ................... 370/252 |
| 2007/0136726 A1 * | 6/2007 | Freeland et al. .............. 718/100 |
| 2007/0143001 A1 | 6/2007 | Park et al. |
| 2007/0168288 A1 | 7/2007 | Bozeman |
| 2007/0198422 A1 | 8/2007 | Prahlad et al. |
| 2007/0203846 A1 | 8/2007 | Kavuri et al. |
| 2007/0219017 A1 | 9/2007 | Liu et al. |
| 2007/0255947 A1 | 11/2007 | Choudhury et al. |
| 2007/0282615 A1 | 12/2007 | Hamilton et al. |
| 2008/0065552 A1 | 3/2008 | Elazar et al. |
| 2008/0074289 A1 | 3/2008 | Sauder et al. |
| 2008/0084877 A1 | 4/2008 | Brzozowski |
| 2008/0086423 A1 | 4/2008 | Waites |
| 2008/0147556 A1 | 6/2008 | Smith et al. |
| 2008/0175235 A1 | 7/2008 | Frifeldt et al. |
| 2008/0228578 A1 | 9/2008 | Mashinsky |
| 2008/0298595 A1 | 12/2008 | Narayanan et al. |
| 2008/0320607 A1 | 12/2008 | Richardson |
| 2009/0051568 A1 | 2/2009 | Corry et al. |
| 2009/0059823 A1 | 3/2009 | Bolduc et al. |
| 2009/0083730 A1 | 3/2009 | Richardson |
| 2009/0138975 A1 | 5/2009 | Richardson |
| 2009/0150674 A1 * | 6/2009 | Richardson et al. .......... 713/171 |
| 2009/0158396 A1 | 6/2009 | Baum et al. |
| 2010/0057703 A1 | 3/2010 | Brandt et al. |

FOREIGN PATENT DOCUMENTS

| | | |
|---|---|---|
| EP | 1 637 958 | 3/2006 |
| EP | 1 637 961 | 3/2006 |
| EP | 1 670 188 A2 | 6/2006 |
| EP | 1 912 413 | 4/2008 |
| WO | 9220022 | 11/1992 |
| WO | 9301550 | 1/1993 |
| WO | 9535533 | 12/1995 |
| WO | 0067095 | 11/2000 |
| WO | WO 01/55876 | 8/2001 |
| WO | WO 2004/023620 | 3/2004 |
| WO | WO 2005/094544 | 10/2005 |
| WO | 2005/104686 A2 | 11/2005 |
| WO | WO 2004/102881 | 11/2005 |
| WO | WO 2006/138393 | 12/2006 |
| WO | 2007/060516 A2 | 5/2007 |
| WO | WO 2007/022134 | 7/2007 |
| WO | WO 2008/004755 | 1/2008 |
| WO | WO 2008/013504 | 1/2008 |
| WO | WO 2008/118074 | 10/2008 |

(56) References Cited

FOREIGN PATENT DOCUMENTS

| WO | 2008157639 | 12/2008 |
| WO | WO 2009/009866 | 1/2009 |
| WO | 2009039504 | 3/2009 |
| WO | 2009065135 | 5/2009 |
| WO | 2009076232 | 6/2009 |
| WO | 2009105702 | 8/2009 |

OTHER PUBLICATIONS

Kohno, Tadayoshi, Andre Broido, and Kimberly C. Claffy. "Remote physical device fingerprinting." Dependable and Secure Computing, IEEE Transactions on 2, No. 2 (2005): 93-108.*

Angha et al.; Securing Transportation Network Infrastructure with Patented Technology of Device Locking—Developed by Uniloc USA; http://www.dksassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch of StrongPoint; http://www.econolite.com/docs/press/20080304_Econolite_StrongPoint.pdf; Mar. 4, 2008.

Williams, "A Painless Guide to CRC Error Detection Algorithms," 33 pages, www.ross.net/crc/download/crc_v3.txt.

International Search Report and Written Opinion for corresponding International Application No. PCT/US2009/044467 dated Nov. 3, 2009, total 14 pages.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm.

Kulbak et al., "The eMule Protocol Specification," DANSS Lab, School of Computer Science and Engineering, The Hebrew University of Jerusalem, Jerusalem, Jan. 17, 2005.

Lai et al., "Context-aware Multimedia Streaming Service for Smart Home," The International Conference on Mobile Technology, Applications & Systems 2008 (Mobility Conference), Sep. 10-12, 2008, Ilan, Taiwan.

Marin et al., "Nomadic Device Identification and Client Provision for Interaction in a Vehicular Network," IADIS International Conference Wireless Applications and Computing, 2008, pp. 29-37.

* cited by examiner

DEVICE AND METHOD FOR SECURED COMMUNICATION

CLAIM OF PRIORITY UNDER 35 U.S.C. §119

The present application for patent claims priority to Provisional Application No. 61/055,129 entitled "DEVICE AND METHOD FOR SECURED COMMUNICATION," filed May 21, 2008, and assigned to the assignee hereof and hereby expressly incorporated by reference herein.

BACKGROUND OF THE INVENTION

1. Field of the Invention

The present invention is directed toward systems for securing communications (e.g., with traffic management centers or the like), and related methods.

2. Description of the Related Art

A trend in the transportation industry is to utilize more cost-effective modes of communication between traffic management centers (TMCs) and traffic controllers located at or near street intersections. The traffic controllers typically comprise, or are otherwise in operative communication with, traffic lights/signals, surveillance cameras, sensors, detectors, etc., one or more of which may be housed in field traffic cabinets at or near the intersections. The traffic controllers and other devices capable of communicating with the TMC often utilize Ethernet and Internet Protocol (IP) based field communications or the like to communicate with and interconnect signalized intersections. A further trend is the utilization of wireless communication protocols for communicating with TMCs and/or traffic controllers.

With the use of Ethernet and Internet as common platforms of choice in many new transportation management applications, there is an increased possibility for security breaches into such traffic networks. Accordingly, current and future traffic management systems may be vulnerable to attack or abuse from unauthorized intruders, e.g., "hackers" or insiders operating outside their authority, gaining access to the system using stolen or "cracked" security information or using authorized emergency control devices to manipulate traffic signals, etc. Such attacks may endanger public safety, erode public confidence in the traffic control and enforcement systems, and reduce municipal revenues.

Accordingly, it would be desirable to provide a cost-effective system and method for improving the security of communications for traffic controllers, such as, for example, controllers, detectors, surveillance cameras, uninterruptible power supply systems, and other devices supporting an IP or web based user interface or the like.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a field security device/apparatus for providing a secure private network (SPN) between a field traffic controller and a traffic management center (TMC). The field security device may include a first connector (e.g., a receiving port) for interfacing with the field traffic controller; a communication/transceiver module; at least one processor operatively coupled to the first connector and the communication module; and a memory module operatively coupled to the at least one processor and comprising executable code for the at least one processor.

The memory module may include executable code for the at least one processor to: access a public network via the communication module; locate an authentication server of the TMC via the public network; and send a device identifier to the authentication server via the communication module, the device identifier being based on a combination of at least one user-configurable parameter and at least one non-user-configurable parameter of the field security device. The memory module may further include executable code for the at least one processor to, in response to the authentication server authenticating the device identifier from the field security device, establish the SPN between the field security device and the TMC. The established SPN may tunnel across one or more segments of the public network.

In related aspects, the at least one non-user-configurable parameter may comprise at least one of CPU ID, CPU model, CPU manufacturer, and CPU voltage. In the alternative, or in addition, the at least one non-user-configurable parameter may be based on a carbon degradation characteristic of a computer chip. In the alternative, or in addition, the at least one non-user-configurable parameter may be based on a silicone degradation characteristic of a computer chip.

In further related aspects, the at least one user-configurable parameter may comprise one of hard disk volume name, user name, device name, user password, and hard disk initialization date.

In yet further related aspects, the device identifier may be generated by utilizing at least one irreversible transformation of the at least one user-configurable and the at least one non-user-configurable parameters. For example, the device identifier may be generated by utilizing a cryptographic hash function on the at least one user-configurable and the at least one non-user-configurable parameters.

In still further related aspects, the public network may comprise a wireless communication network. The wireless communication network may implement at least one of CDMA and GSM standards. In the alternative, or in addition, the wireless communication network may implement at least one of 802.11a, 802.11b, 802.11g, 802.11n, and 802.11p (Dedicated Short Range Communications) standards.

In further related aspects, the traffic controller may comprise a traffic signal, a surveillance camera, etc. The traffic controller may be housed in a field traffic cabinet or the like. The field security device may be adapted to be housed in the field traffic cabinet.

In accordance with other aspects of the embodiments described herein, there is provided a server (e.g., an authentication server) for providing a SPN between a TMC and a field security device, the field security device being in operative communication with a field traffic controller. For example, the server may include: a communication module adapted to receive a device identifier over a public network from the field security device, the device identifier being based on a combination of at least one user-configurable parameter and at least one non-user-configurable parameter of the field security device; at least one processor operatively coupled to the communication module; and a memory module operatively coupled to the at least one processor and comprising executable code for the at least one processor.

The memory module may include executable code for the at least one processor to, in response to the communication module receiving the device identifier from the field security device, access a database of authorized device identifiers corresponding to known field security devices. The memory module may further include executable code for the at least one processor to, in response to the received device identifier matching one of the authorized device identifiers, establish the SPN between the field security device and the TMC.

In accordance with other aspects of the embodiments described herein, there is provided a network device for securely communicating with a TMC. The network device may include: a communication module adapted to access a public network; at least one processor operatively coupled to the communication module; and a memory module operatively coupled to the at least one processor and comprising executable code for the at least one processor.

The memory module may include executable code for the at least one processor to: access the public network via the communication module; locate an authentication server of the TMC via the public network; and send a device identifier to the authentication server via the communication module, the device identifier being based on a combination of at least one user-configurable parameter and at least one non-user-configurable parameter of the network device. The memory module may further include executable code for the at least one processor to, in response to the authentication server authenticating the device identifier from the network device, establish a SPN between the network device and the TMC.

In accordance with other aspects of the embodiments described herein, there is provided a method for providing a SPN between a TMC and a device (e.g., a field security device, a network device, etc.). The method may involve: accessing a public network; locating an authentication server of the TMC via the public network; and sending a device identifier for the device to the authentication server via the communication module, the device identifier being based on a combination of at least one user-configurable parameter and at least one non-user-configurable parameter of the device. The method may further involve, in response to the authentication server authenticating the device identifier, establishing the SPN between the TMC and the device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The present invention addresses the need for a system and method for providing secured communication, wireless or otherwise. In the exemplary embodiments described herein, there are presented systems and methods for securing communication between and among traffic controllers and traffic management centers (TMCs), thereby protecting field traffic control systems from the effects of external cyber-threats. It is noted the invention is not limited to securing communication with TMCs; rather, the technology described herein may be used to secure communications between a plurality of locations.

Such a system preferably shields traffic management systems against denial-of-service (DOS) attacks and address resolution protocol (ARP) redirecting or spoofing originating from malicious code threats. Such a system preferably implements device-based access control to restrict field-control network access only to authorized PCs or devices. Such a system preferably eliminates transportation network vulnerabilities due to unknown security compliance by private network sharers, and makes it possible to monitor and manage field security configuration and status from the TMC.

Such a system may include field security devices that send device identifiers to the TMC in an automated manner, and that establish a secured private network between selected system components based at least in part on whether the device identifier is on the list of authorized device identifiers, thereby determining whether a field security device qualifies as a known device. The device identifiers may be based on a combination of user-configurable and non-user-configurable parameters of the field security device. Such authentication and secured communication techniques may be used alone, or in conjunction with other security or authentication measures.

Figure 1:
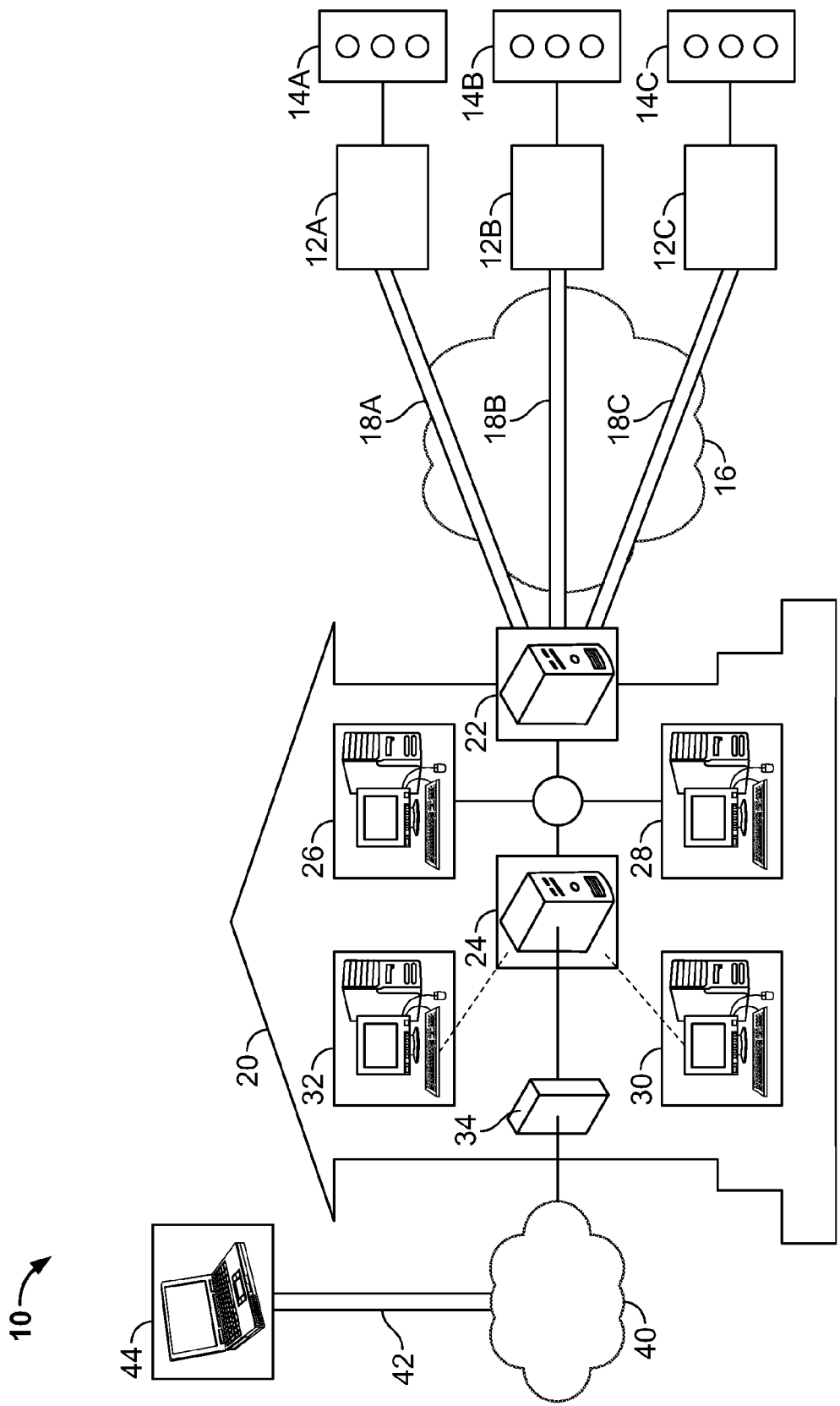
FIG. 1 provides a block diagram of certain components of an exemplary system for secured communication with a traffic management center (TMC).

System for Secured Communication with a Traffic Management Center (TMC):

With reference FIG. 1, there is provided an embodiment of a system 10 for securing communication with a TMC 20. Three traffic controllers 14A, 14B, 14C are shown; however, it will be understood that the system 10 may comprise any number of traffic controllers 14. Each traffic controller 14 may comprise a traffic light or signal, a surveillance camera, detectors, sensors, etc., one or more of which may be housed in a field traffic cabinet. In one embodiment, a traffic controller 14 is operatively coupled to a traffic light.

In the illustrated embodiment, field security devices/apparatuses 12A, 12B, and 12C are operatively coupled to the traffic controllers 14A, 14B, and 14C, respectively. Each field security device 12 may function as a security appliance that creates a secure, virtual-network layer connection between a given traffic controller 14 (coupled to the given field security device 12) and the TMC 20. As will be explained in further detail below, the field security devices 12A, 12B, 12C and authentication server 22 at the TMC 20 utilize device recognition technology to establish secure private networks 18A, 18B, and 18C between the TMC 20 and the field security devices 12A, 12B, and 12C, respectively.

Each secure private network (SPN) 18 may tunnel across one or more segments of a public network 16. The public network 16 (as well as public network 40) may comprise one or more public portions of the Internet (e.g., 802.3, DSL, cable, Ethernet, etc.). The public networks 16, 40 may comprise a wireless communication network, such as, for example, CDMA, GSM, etc. The public networks 16, 40 may comprise a wireless local area network (WLAN), such as, for example, 802.11a, 802.11b, 802.11g, 802.11n, 802.11p, etc. It is noted that the public networks 16, 40 may comprise any communication network, wired or wireless, utilizing any known standards, such as, for example, wide area networks (WANs), campus area networks (CANs), metropolitan area networks (MANs), wireless application protocol (WAP), etc. In the alternative, or in addition, the SPN 18 may tunnel across a traffic control network, a portion of which is public.

The TMC 20 may include an authentication server 22 that is in operative communication with one or more workstations 26, 28, such as, for example, via a node/switch in between the authentication server 22 and a general server 24 (i.e., not an authentication server). The TMC may include a firewall 34 between the general server 24 and the public network 40, and thereby add another layer of protection for communications to and from the TMC 20. In the alternative, or in addition, the TMC may comprise a firewall (not shown) between the authentication server 22 and the public network 16. In the alternative, or in addition, one or more authentication servers and/or workstations operatively coupled to the authentication servers may be located outside of the TMC, such as, for example, at a remote site.

The system 10 may include a network device 44, such as, for example, laptop computer, tablet computer, PDA, mobile phone or device, etc. The network device 44 may comprise, for example, a field technician's laptop for troubleshooting traffic controllers 14A, 14B, and 14C. Device 44 needs to connect to authentication server 22 in order to establish an SPN 42 between a user of the network device 44 (e.g., a field engineer) and the TMC 20. In one embodiment, the device 44 bypasses the firewall 34 via a VPN soft-server on the server 24. Once the authentication server 22 authorizes device 44, the SPN 42 is established. The SPN 42 may essentially function as a tunnel within the VPN soft-server, and therefore may be analogous to a tunnel within a tunnel. In another embodiment (not shown), a field security device 12 may acts as a proxy for a network device 44 whose user wishes to access the network, when the network device 44 is connected behind the field security device 12.

It is noted that SPN 18 has the ability to provide a star topology whereby the field security devices 12A, 12B, 12C may communicate with each other, through server 22, thereby providing a way for traffic controllers 14A, 14B, and 14C to communicate with each other as well. For example, in one embodiment, SPN 18 may be configured to that field security devices 12A, 12B, 12C can only communicate with server 22 (and workstations 26, 28). Such an embodiment would normally be applicable to an Enterprise Server deployment, thereby preventing a TMC for one city from affecting critical assets of a TMC of another city.

Figure 3:
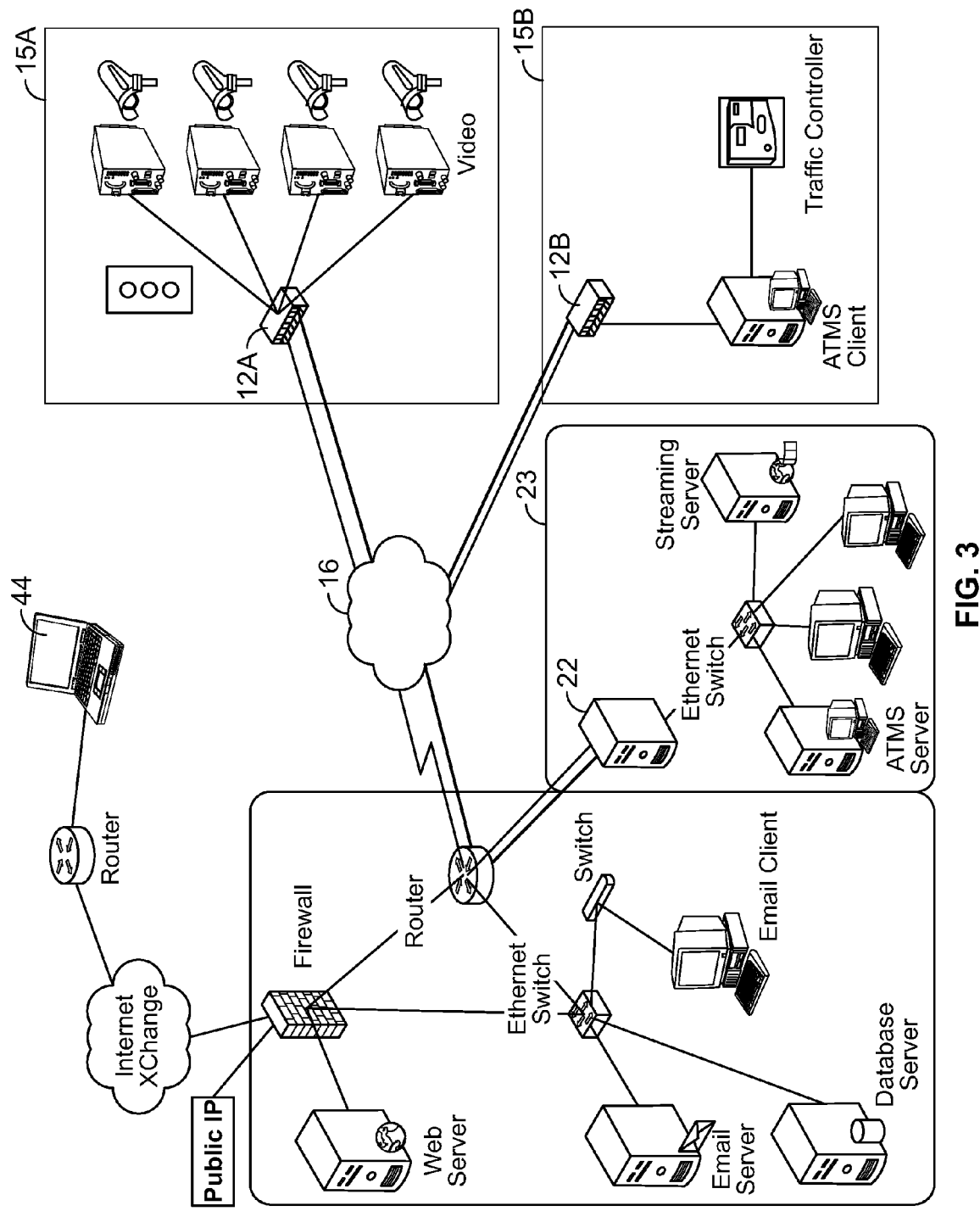
FIG. 3 illustrates an exemplary embodiment of a network for secure communication between field security devices and an authentication server.

FIG. 3 illustrates an exemplary embodiment of a network for securing communication between the field security devices 12A, 12B and the authentication server 22. Portions 15A, 15B, and 23 of the shown network represent the secured portions of the network. Portion 15A may include a field security device 12A in operative communication with a traffic signal/light and/or surveillance/video camera(s). Portion 15B may include a field security device 12B in operative communication with an Advanced Traffic Management Systems (ATMS) client, which is in operative communication with a traffic controller. Portion 23 may include an authentication server 22 in operative communications with other servers, such as, for example, an ATMS server or a streaming server, via an Ethernet switch or the like. The network device 44 (e.g., laptop computer) may also be authenticated via the server 22 for access to the field security devices 12A, 12B.

Device Identifiers:

As noted above, the field security devices 12A, 12B, 12C and the authentication servers 22, 24, as well as the network device 44, may utilize device recognition technology to establish SPNs 18A, 18B, and 18C. For example, each field security device 12 may be adapted to transmit self-identification information to the authentication server 22 upon being powered up in the field. The self-identification information or device identifier generally comprises information that is expected to be unique for the field security device 12. For example, the device identifier for a given field security device 12 may comprise a serial number and/or location information (e.g., an IP address, geo-location code, etc.).

The device identifier is preferably generated from machine parameters of the field security device 12, such as, for example, hard disk volume name, user name, device name, user password, hard disk initialization date, etc. The machine parameters may relate to the platform on which the web browser runs, such as, for example, CPU number, or unique parameters associated with the firmware in use. The machine parameters may also include system configuration information, such as amount of memory, type of processor, software or operating system serial number, etc. The device identifier generated from the machine parameters may include the field security device's IP address and/or other geo-location code to add another layer of specificity to field security device's unique identifier. In the alternative, or in addition, the device identifier may comprise a randomly generated and assigned number that is unique for the field security device 12.

In one embodiment, the device identifier for the field security device 12 is generated and stored in the field security device's memory before the field security device 12 is deployed into the field. In another embodiment, the device identifier, or a portion thereof, is generated after the field security device 12 is deployed and/or powered on in the field.

It is noted that an application running on the field security device 12 or otherwise having access to the field security device's hardware and file system may generate a unique device identifier using a process that operates on data indicative of the field security device's configuration and hardware. The device identifier may be generated using a combination of user-configurable and non-user-configurable machine parameters as input to a process that results in the device identifier, which may be expressed in digital data as a binary number. Each machine parameter may include data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier that has a very high probability of remaining unchanged during normal operation of the target device. Thus, the resulting device identifier should be highly specific, unique, reproducible and stable as a result of properly selecting the machine parameters.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same field security device for which the device identifier was first generated. Conversely, each identifier, again to a very high degree of certainty, can be successfully reproduced by the suitably configured application operating or otherwise having access to the same field security device on which the identifier was first generated.

The application may operate by performing a system scan to determine a present configuration of the field security device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; BlackBox model; BlackBox serial; BlackBox details; BlackBox damage map; BlackBox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

In one example, the device identifier may also be generated by utilizing machine parameters associated with one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

Figure 2:
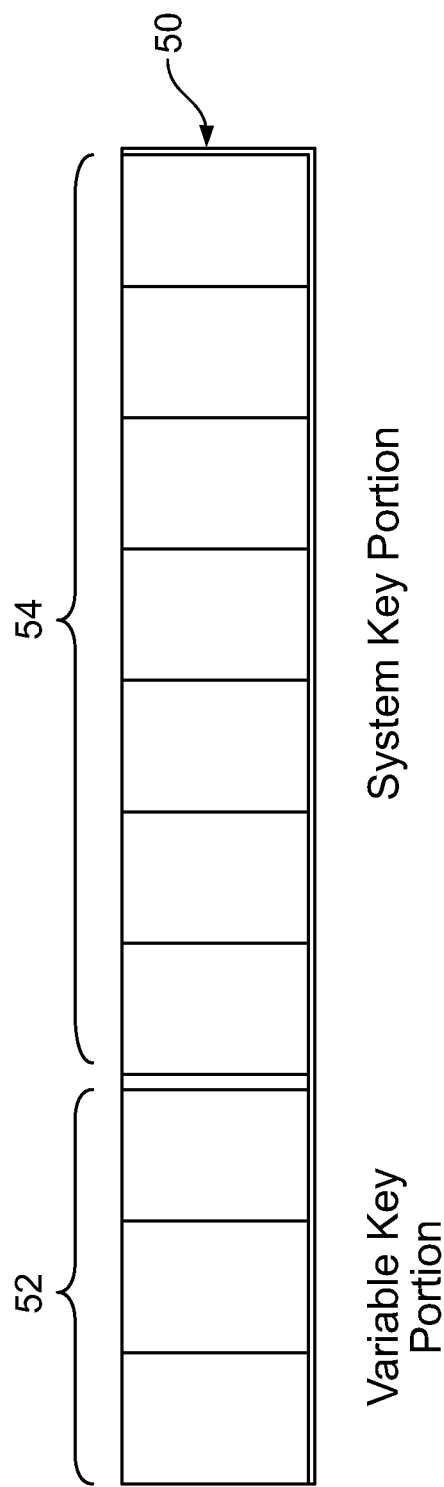
FIG. 2 illustrates components of an exemplary device identifier.

With reference to FIG. 2, in one exemplary embodiment, a device identifier 50 may include two components—namely, a variable key portion 52 and a system key portion 54. The variable key portion 52 may be generated by reference to a variable platform parameter, such as via reference to system time information, although other parameters which are variable may be utilized in other embodiments. The system key portion 54 may include the above described parameters expected to be unique to the field security device 12, such as, for example, hard disk volume name, user name, computer name, user password, hard disk initialization date, or combinations thereof Portions 52 and/or 54 may be combined with the IP address and/or other platform parameters of the field security device 12. It is noted that device identifiers, or portions thereof, may be encrypted to add an additional layer of specificity and security.

It is noted that device identifiers may be generated for the network device 44, authentication server 22, and workstations 26, 28 in the same manner as described above for the field security devices 12. With reference to the exemplary embodiment of FIG. 1, only server 22, workstations 26 and 28, and laptop 44 have been authenticated.

Secure Private Networks (SPNs):

With continued reference to the exemplary embodiment of FIG. 1, it is noted that each field security device 12 is generally adapted to transmit its device identifier back to the TMC 20. Upon being powered on and/or connected to the traffic controller 14, the field security device 12 preferably accesses an available public network 16, locates or identifies an authentication server 22 at the TMC 20, and then establishes a connection with the authentication server 22. Upon establishing a connection with the authentication server 22, the field security device 12 may transmit its device identifier to the authentication server 22. The device identifier is preferably encrypted prior to being transmitted by the field security device 12 over to the public network 16, and then decrypted when received by the authentication server 22.

In response to receiving the device identifier from a given field security device 12, the authentication server 22 may access a database of authorized device identifiers corresponding to known devices that are authorized to establish a SPN 18 with the TMC 20. The database may be located at the TMC 20, such as, for example, on one of the servers 22, 24 and/or workstations 26, 28, 30, 32. The database is preferably located on server 22 and/or workstations 26, 28. In the alternative, or in addition, the database may be located on a server or machine that is not located at the TMC 20, yet is accessible by server 22.

When the device identifier from the field security device 12 matches one of the authorized device identifiers in the database, the authentication server 22 and the field security device establish a SPN with each other, and thereby create an SPN 18 between the TMC 20 and the traffic controller 14. The SPN 18 generally tunnels across one or more segments of the public network 16 to provide a secure channel of communication between the TMC 20 and the traffic controller 14.

The SPN 18 may be established according to any known technique, such as, for example, via the creation of virtual private networks (VPNs), in which some of the links between nodes are carried by open connections or virtual circuits in a larger network, such as, for example, public portions of the Internet. Link-layer protocols of the virtual network may be tunneled through the larger network.

The field security devices/appliances 12 may get serialized labeling at the manufacturing facility, similar to copies of software for authenticity and tracking/history. For plug-and-play in the field, the appliances may first be connected directly to the authentication server, which may be done at a field tech's offices before initial server deployment, and the IP address of the server may be stored. The device fingerprint may also be taken at this time. The deployment address for each appliance may be entered into the server, such as for use in automated geographic mapping of appliance locations. In the alternative, the appliances 12 may be configured from the field using an authenticated PC connected to the appliance.

It is noted that one or more SPNs 42 may be established between the authentication server 22 and any network devices 44 in the same manner as described above for the field security devices 12. The SPN 42 may tunnel across one or more segments of the public network 42 to provide a secure channel of communication between the TMC 20.

In one embodiment, the field security device 12 sends its device identifier or machine fingerprint to the authentication server 22. When the server 22 verifies that the device identifier corresponds to a known or authorized device, the server sends an authentication/verification signal to the device 12. The device 12 then sends a certificate or public key to the server 22 to establish the SPN 18. The server 22 uses a private key to check the certificate. The server 22 then sends a server certificate or public key back to the device 12 to establish the SPN 18.

Field Security Device:

The field security device 12 may also be referred to as a field appliance and creates a secure, virtual-network layer connection between the TMC 20 over otherwise public communication networks, including or utilizing the Internet, Ethernet, and wireless technologies. The field security device 12 may be operatively coupled to controllers, sensors, detectors, surveillance cameras, uninterruptible power supply (UPS) systems, or other devices supporting an IP or web based user interface.

In accordance with one aspect of the embodiments described herein, there is provided a field security device 12 for providing a SPN 18 between a field traffic controller 14 and a TMC 20, comprising: a first connector for interfacing with the field traffic controller 14; a communication module; a processor module operatively coupled to the first connector and the communication module; and a memory module operatively coupled to the processor module. In one embodiment, the memory module comprises executable code for the processor module to: (a) access a public network 16 or traffic control network via the communication module; (b) locate and/or connect with an authentication server 22 of the TMC 20 via the public network 16; and (c) send a device identifier to the authentication server 22 via the communication module, the device identifier being based on a combination of both user-configurable and non-user-configurable parameters of the field security device 12; and (d) in response to the authentication server 22 authenticating the device identifier from the field security device 12, establish the SPN 18 between the field security device 12 and the TMC 20, wherein the established SPN 18 tunnels across at least one segment of the public network 16.

The processor module of the field security device 12 may comprise one or more processors, such as, for example, a Motorola MPC8321EEC Microprocessor (333 MHz core processor speed, 32 MB flash memory, 64 MB DDR2 memory, 32 MBs VPN throughput) or the like. The first connector of the field security device 12 may comprise a receiving port or the like (e.g., 1WAN, 4WAN, RJ45, 10/100 Mbit/s Ethernet, etc.).

The field security device 12 is preferably adapted for easy plug-and-play field installation, with no field PC required, no device configuration required in the field, and no passwords or keys required to manage. In essence, when the field security device 12 is connected or powered up, it preferably "phones home" to an authentication server and establishes its own device-locked point-to-point SPN 18.

The memory module of the field security device 12 may further comprise executable code for the processor module to detect network intrusions, determine locations of the intrusions, and notify the TMC 20. The field security device 12 may be adapted to continuously or periodically verify its operational status via one or more authentication servers at the TMC 20. The field security device 12 is preferably cross-platform compatible with any operating system and field control hardware. The field security device 12 is preferably adapted to be NEMA TS2 compliant.

The field security device 12 may be adapted to connect to any known network routers, switches, and/or firewall security devices. The field security device 12 may be adapted to perform a self-test at startup. The field security device 12 may comprise one or more LED indicators to power and communications link status, or activities status.

The field security device 12 may be field hardened for use inside or outside of the field traffic cabinet. The field security device 12 may be shelf mountable for easy in-cabinet placement with optional DIN rail or sidewall mounting. The field security device 12 may be adapted to defined environmental conditions, such as, for example, −29° F. to +165° F. (−34° C. to +74° C.), 0 to 95% relative humidity.

It is noted that the security device/appliance 12 may be adapted to access, learn, or otherwise determine the MAC IDs of traffic controllers 14 or other devices operatively coupled with (e.g., plugged into) the device 12. Further, the device 12 may utilize the learned MAC IDs to establish bi-directional security with such traffic controllers 14, thereby prohibiting unknown/unauthorized network devices from connecting to the secured network via the device 12. For example, the device 12 may comprise a memory module storing executable code for a processor module to access and store into the memory module MAC IDs of those traffic controllers 14 connected to the device 12. The executable code may further comprise instructions for the processor module to relay the MAC ID or derivations thereof to the TMC 20 to verify whether the MAC ID or derivation thereof corresponds to a known or authorized device. In response to the authentication server 22 of the TMC 20 authenticating the MAC ID or derivation thereof, the device 12 may allow the traffic controller 14 to communicate via a SPN 18 between the TMC 20 and the device 12. Otherwise, the traffic controller 14 is blocked or prohibited from communicating with the TMC 20 via SPN 18.

Authentication Server:

In accordance with another aspect of the embodiments described herein, there is provided an authentication server 22 for providing a SPN 18 between a TMC 20 and a field security device 12, the field security device 12 being in operative communication with a field traffic controller 14, comprising: a communication module adapted to receive a device identifier over a public network 16 from the field security device 12, the device identifier being based on a combination of both user-configurable and non-user-configurable parameters of the field security device 12; a processor module operatively coupled to the communication module; and a memory module operatively coupled to the processor module. In one embodiment, the memory module comprises executable code for the processor module to: (a) in response to the communication module receiving the device identifier from the field security device 12, access a database of authorized device identifiers corresponding to known field security devices; and (b) in response to the received device identifier matching one of the authorized device identifiers, establish the SPN 18 between the field security device 12 and the TMC 20, wherein the established SPN 18 tunnels across at least one segment of the public network 16.

When multiple field security devices 12A, 12B, 12C establish SPNs 18A, 18B, 18C with a given authentication server 22, a point-to-multipoint SPN may be established between the TMC 20 with each field traffic cabinet in which the field security devices 12A, 12B, 12C may be located.

The authentication server 22 alone or in conjunction with the workstations 26, 28 and/or other components of the TMC 20, may allocate, manage, and control the field security devices 12 and/or PC clients from a single location, such as, for example, the TMC 20. The TMC 20 and components thereof make it possible to gain real-time insight into the status of the field security devices 12 and network devices 44 (e.g., a PC client or the like) participating in the secured network or system 10.

Further, the components of the system 10 described herein make it possible to define and receive instant status reports and updates regarding any changes to the secured network, and to receive alerts regarding any unauthorized access attempts by unauthorized devices. The notifications or alerts at the server 22 regarding such unauthorized connection attempts may include information regarding the unauthorized device, the time of the attempted access, the geo-location of the unauthorized device or point of attempted access, etc.

In accordance with another aspect of the embodiments described herein, there is provided an enterprise server that may connect or be in operative communication with a plurality of "child" authentication servers. The child authentication servers may be located at multiple TMCs. The master or enterprise server may be adapted to allow authorized field technicians to have access to the multiple TMCs via one enterprise server or service provider. Such technicians may have simultaneous access to the TMCs via the enterprise server. In the alternative, or in addition, each of the authorized technicians may have the ability to simultaneously access one or more of the field security devices that are in operative communicative communication with the TMCs via the enterprise server.

In accordance with yet another aspect of the embodiments described herein, there is provided a system wherein the authentication server 22 sends its own device identifier or machine fingerprint to the field security device 12 for mutual or two-way authentication. In addition to having the server 22 verify and authenticate the device 12's identifier, the device 12 also verifies and authenticates the server 22's identifier, before a SPN 18 is established between the device 12 and the server 22. Such a system would provide a more robust scheme for securing communication with the TMC 20. In the alternative, or in addition, the authentication server 22 may be adapted to sends its device identifier to a network device 44 (explained in further detail below) for mutual authentication between the server 22 and the device 44, without which the SPN 42 may not be established.

Network Device:

In accordance with another aspect of the embodiments described herein, there is provided a network device 44 (e.g., a laptop computer or PDA) for securely communicating with a TMC 20, comprising: a communication module adapted to access a public network; a processor module operatively coupled to the communication module; and a memory module operatively coupled to the processor module. In one embodiment, the memory module comprises executable code for the processor module to: (a) access the public network 40 via the communication module; (b) locate and/or connect with an authentication server 22 of the TMC 20 via the public network 40; (c) send a device identifier to the authentication server 22 via the communication module, the device identifier being based on a combination of both user-configurable and non-user-configurable parameters of the network device 44; and (d) in response to the authentication server 22 authenticating the device identifier from the network device 44, establish a SPN 42 between the network device 44 and the TMC 20, wherein the established SPN 42 tunnels across at least one segment of the public network 40.

The network device 44, as well as the workstations 26, 28, may comprise client software for device fingerprinting and registration on SPNs or the like. It is noted that the network device 44 may comprise a client software that designates the network device 44 as a field technician device, as opposed to TMC workstation devices 26 and 28, which may have licensing provisions that are different from other network devices. The client software on device 44 may comprise instructions for its host network device to: access a public network; locate an authentication server 22 of the TMC 20 via the public network 40; send a device identifier to the authentication server 22, wherein the device identifier is based on a combination of at least one user-configurable parameter and at least one non-user-configurable parameter of the host network device. The client software may further comprise instructions for its host network device to: in response to the authentication server 22 authenticating the device identifier, establish a SPN 42 with the TMC 20, wherein the established SPN 42 tunnels across at least one segment of the public network 40.

Method for Providing a SPN:

In accordance with another aspect of the embodiments described herein, there is provided a method for providing a SPN between a device (e.g., field security device 12 or network device 44) and a TMC, comprising: accessing a public network (e.g., networks 16 or 40); and locating and/or connecting with an authentication server (e.g., server 22) of the TMC via the public network.

The method may further comprise sending a device identifier for the device to the authentication server via the communication module, the device identifier being based on a combination of both user-configurable and non-user-configurable parameters of the network appliance.

The method may further comprise, in response to the authentication server authenticating the device identifier, establishing the SPN between the TMC and the device. The established SPN preferably tunnels across at least one segment of the public network.

Figure 4:
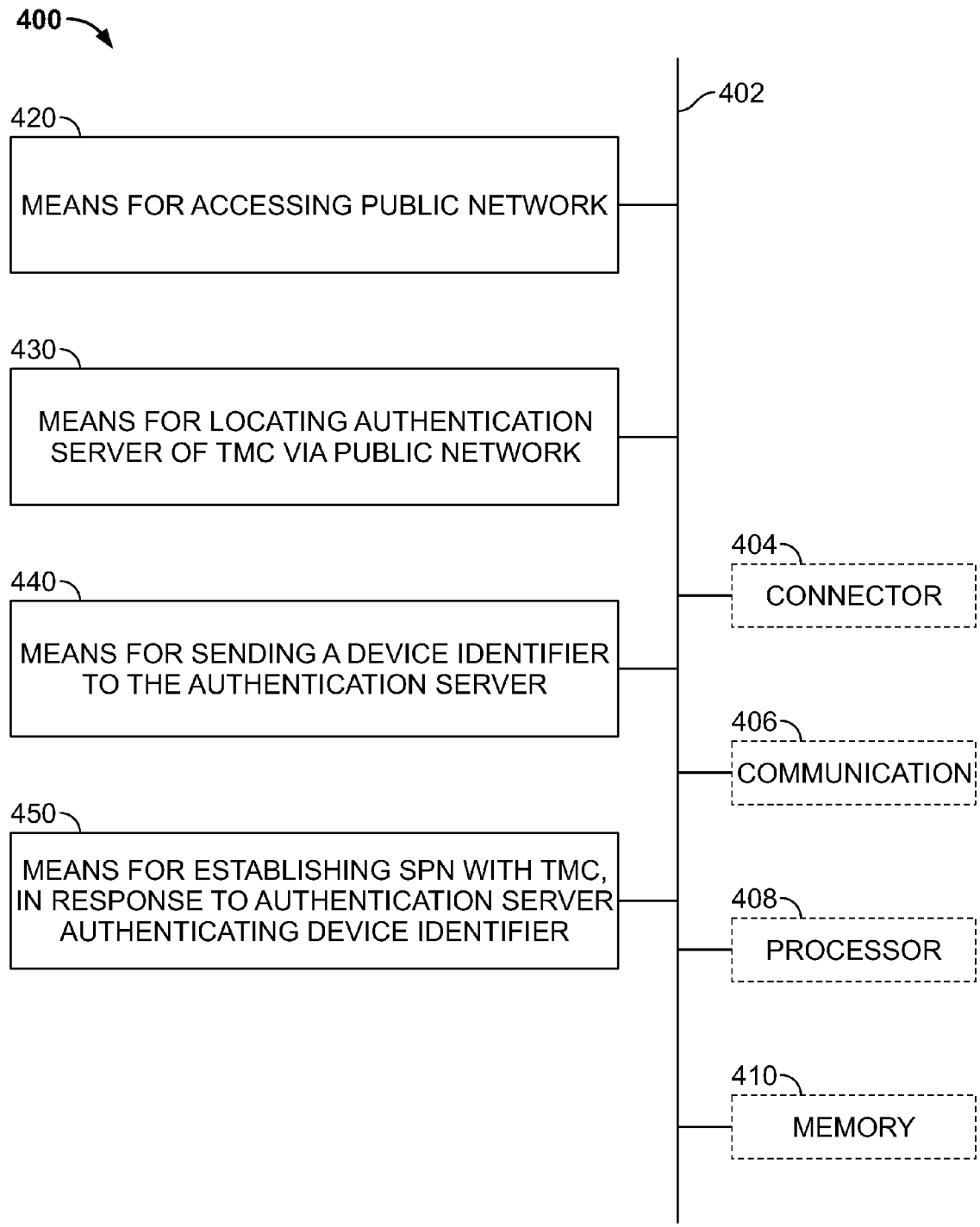
FIG. 4 illustrates one embodiment of an apparatus for providing a secure private network (SPN) between a field traffic controller and a TMC.

Apparatuses for Providing SPNs:

In accordance with one or more aspects of the embodiments described herein, there are provided devices and apparatuses (e.g., field security devices or the like) for providing a SPN between a field traffic controller and a TMC. With reference to FIG. 4, there is provided an exemplary apparatus 400 that may be configured as either a computing device, or as a processor or similar device for use within a computing device. As illustrated, apparatus 400 may comprise a means 420 for accessing a public network (e.g., the public Internet), such as, for example, via a communication/transceiver module 406, adapted for wireless communication or otherwise. Apparatus 400 may comprise: a means 430 for locating an authentication server of a TMC or the like via the public network; and a means 440 for sending a device identifier to the authentication server via the communication module 406 or the like. The device identifier may be based on a combination of at least one user-configurable parameter and at least one non-user configurable parameter of the apparatus. In this way, the device identifier is unique and no device will share the same identifier. The apparatus 400 may comprise a means 450 for establishing a SPN between itself and the TMC, in response to the authentication server authenticating the device identifier from the apparatus 400. The established SPN may tunnel across one or more segments of the public network.

In related aspects, the at least one non-user-configurable parameter may comprise at least one of CPU ID, CPU model, CPU manufacturer, and CPU voltage for apparatus 400. In the alternative, or in addition, the at least one non-user-configurable parameter may be based on a carbon degradation characteristic of a computer chip of apparatus 400. In the alternative, or in addition, the at least one non-user-configurable parameter may be based on a silicone degradation characteristic of a computer chip of apparatus 400.

In further related aspects, the at least one user-configurable parameter may comprise one of hard disk volume name, user name, device name, user password, and hard disk initialization date for apparatus 400.

In yet further related aspects, the device identifier may be generated by utilizing at least one irreversible transformation of the at least one user-configurable and the at least one non-user-configurable parameters of apparatus 400. For example, the device identifier may be generated by utilizing a cryptographic hash function on the at least one user-configurable and the at least one non-user-configurable parameters of apparatus 400.

In still further related aspects, the public network may comprise a wireless communication network. The wireless communication network may implement at least one of CDMA and GSM standards. In the alternative, or in addition, the wireless communication network may implement at least one of 802.11a, 802.11b, 802.11g, 802.11n, and 802.11p standards.

In further related aspects, the traffic controller may comprise a traffic signal, a surveillance camera, etc. The traffic controller may be housed in a field traffic cabinet or the like. The field security device may be adapted to be housed in the field traffic cabinet.

It is noted that apparatus 400 may optionally include a processor module 408 having at least one processor, in the case of apparatus 400 configured as computing device, rather than as a processor. Processor 408, in such case, may be in operative communication with means 420-450, and components thereof, via a bus 402 or similar communication coupling. Processor 408 may effect initiation and scheduling of the processes or functions performed by means 420-450, and components thereof.

In related aspects, apparatus 400 may include a connector 404 (e.g., a receiving port) for interfacing with the field traffic controller. Apparatus 400 may include a communication module 406 for communicating with means 420-450. A stand alone receiver and/or stand alone transmitter may be used in lieu of or in conjunction with communication module 406.

In further related aspects, apparatus 400 may optionally include a means for storing information, such as, for example, a memory device/module 410. Computer readable medium or memory device/module 410 may be operatively coupled to the other components of apparatus 400 via bus 402 or the like. The computer readable medium or memory device 410 may be adapted to store computer readable instructions and data for effecting the processes and behavior of means 420-450, and components thereof, or processor 408 (in the case of apparatus 400 configured as a computing device) or the methods disclosed herein.

In yet further related aspects, the memory module 410 may optionally include executable code for the processor module 408 to provide a SPN between a TMC and a device (e.g., a field traffic controller) by: (a) accessing a public network; (b) locating an authentication server of the TMC via the public network; (c) sending a device identifier for the device to the authentication server; and (d) establishing the SPN between the TMC and the device, in response to the authentication server authenticating the device identifier. One or more of steps (a)-(d) may be performed by processor module 408 in lieu of or in conjunction with the means 420-450 described above.

Figure 5:
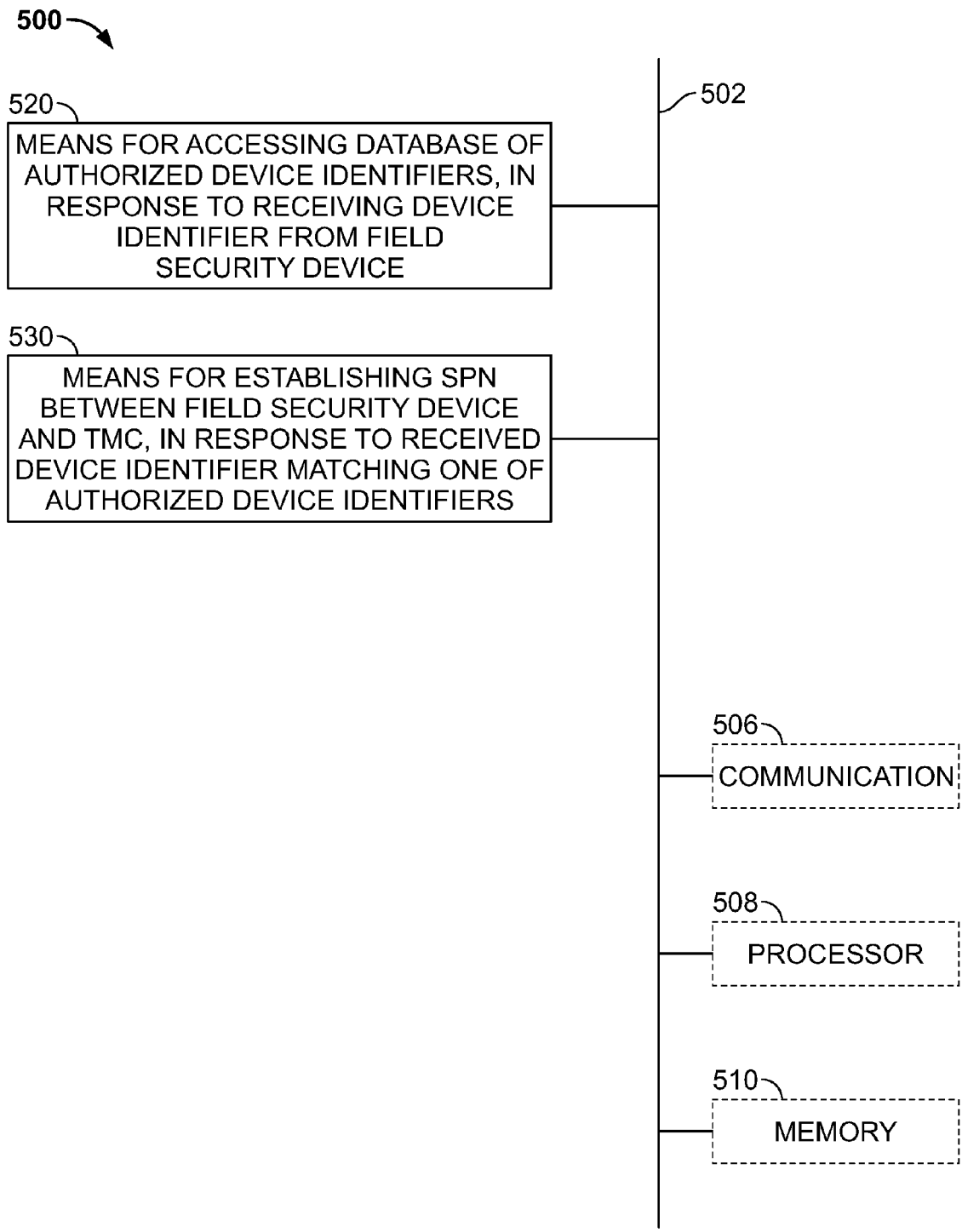
FIG. 5 illustrates one embodiment of an apparatus for providing a SPN between a TMC and a field security device.

In accordance with one or more aspects of the embodiments described herein, FIG. 5 illustrates an exemplary apparatus 500 (e.g., an authentication server) for providing a secure private network between a TMC and a field security device, the field security device being in operative communication with a field traffic controller. Apparatus 500 may include a communication module 506 adapted to receive a device identifier over a public network from the field security device, the device identifier being based on a combination of at least one user-configurable parameter and at least one non-user-configurable parameter of the field security device. Apparatus 500 may include at least one processor operatively coupled to the communication module 506, and a memory module 510 operatively coupled to the at least one processor and comprising executable code for the at least one processor.

Apparatus 500 may comprise a means 520 for accessing a database of authorized device identifiers corresponding to known field security devices, in response to communication module 506 receiving the device identifier from the field security device. Means 520 may comprise a means (not illustrated) whereby registered and authorized field devices may access the SPN. Apparatus 500 may further comprise a means 530 for establishing the SPN between the field security device and the TMC, in response to the received device identifier matching one of the authorized device identifiers. In related aspects, apparatus 500 may comprise an authentication server that is optionally located at the TMC.

It is noted that apparatus 500 may optionally include a processor module 508 having at least one processor, in the case of apparatus 500 configured as computing device, rather than as a processor. Processor 508, in such case, may be in operative communication with means 520-530, and components thereof, via a bus 502 or similar communication coupling. Processor 508 may effect initiation and scheduling of the processes or functions performed by means 520-530, and components thereof.

In related aspects, a stand alone receiver and/or stand alone transmitter may be used in lieu of or in conjunction with communication module 406. In further related aspects, apparatus 500 may optionally include a means for storing information, such as, for example, a memory device/module 510. Computer readable medium or memory device/module 510 may be operatively coupled to the other components of apparatus 500 via bus 502 or the like. The computer readable medium or memory device 510 may be adapted to store computer readable instructions and data for effecting the processes and behavior of means 520-530, and components thereof, or processor 508 (in the case of apparatus 500 configured as a computing device) or the methods disclosed herein.

In yet further related aspects, the memory module 510 may optionally include executable code for the processor module 508 to provide a SPN between a TMC and a field security device (in operative communication with a field traffic controller) by: (a) in response to the communication module receiving the device identifier from the field security device, accessing a database of authorized device identifiers corresponding to known field security devices; and (b) in response to the received device identifier matching one of the authorized device identifiers, establishing the SPN between the field security device and the TMC. One or more of steps (a)-(b) may be performed by processor module 508 in lieu of or in conjunction with the means 520-530 described above.

Figure 6:
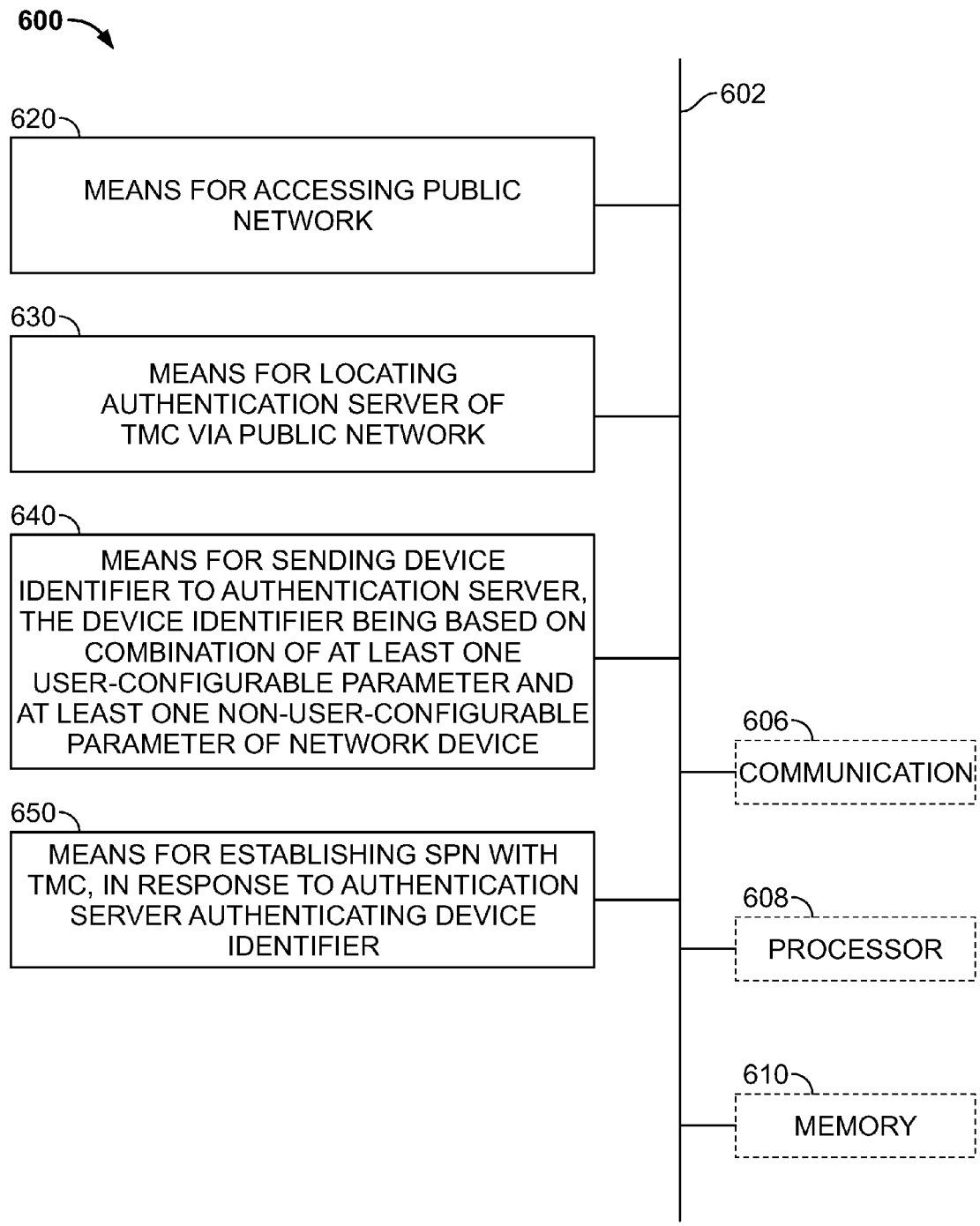
FIG. 6 illustrates one embodiment of an apparatus for securely communicating with a TMC.

In accordance with one or more aspects of the embodiments described herein, FIG. 6 illustrates an exemplary apparatus 600 (e.g., a network device) for securely communicating with a TMC. Apparatus 600 may include a communication module 606 adapted to access a public network. Apparatus 600 may include at least one processor operatively coupled to the communication module 606, and a memory module 610 operatively coupled to the at least one processor and comprising executable code for the at least one processor.

Apparatus 600 may comprise a means 620 for accessing the public network, and a means 630 for locating an authentication server of the TMC via the public network. Apparatus 600 may further comprise a means 640 for sending a device identifier to the authentication server, the device identifier being based on a combination of at least one user-configurable parameter and at least one non-user-configurable parameter of the network device. Apparatus 600 may further comprise a means 650 for establishing a SPN with the TMC, in response to the authentication server authenticating the device identifier. In related aspects, apparatus 600 may comprise a laptop computer, a mobile phone, or any other network device.

It is noted that apparatus 600 may optionally include a processor module 608 having at least one processor, in the case of apparatus 600 configured as computing device, rather than as a processor. Processor 608, in such case, may be in operative communication with means 620-650, and components thereof, via a bus 602 or similar communication coupling. Processor 608 may effect initiation and scheduling of the processes or functions performed by means 620-650, and components thereof.

In related aspects, a stand alone receiver and/or stand alone transmitter may be used in lieu of or in conjunction with communication module 606. In further related aspects, apparatus 600 may optionally include a means for storing information, such as, for example, a memory device/module 610. Computer readable medium or memory device/module 610 may be operatively coupled to the other components of apparatus 600 via bus 602 or the like. The computer readable medium or memory device 610 may be adapted to store computer readable instructions and data for effecting the processes and behavior of means 620-650, and components thereof, or processor 608 (in the case of apparatus 600 configured as a computing device) or the methods disclosed herein.

In yet further related aspects, the memory module 610 may optionally include executable code for the processor module 608 to securely communicate with a TMC by: (a) accessing the public network; (b) locating an authentication server of the TMC via the public network; (c) sending a device identifier to the authentication server; and (d) establishing a SPN with the TMC, in response to the authentication server authenticating the device identifier. One or more of steps (a)-(d) may be performed by processor module 608 in lieu of or in conjunction with the means 620-650 described above.

Figure 7:
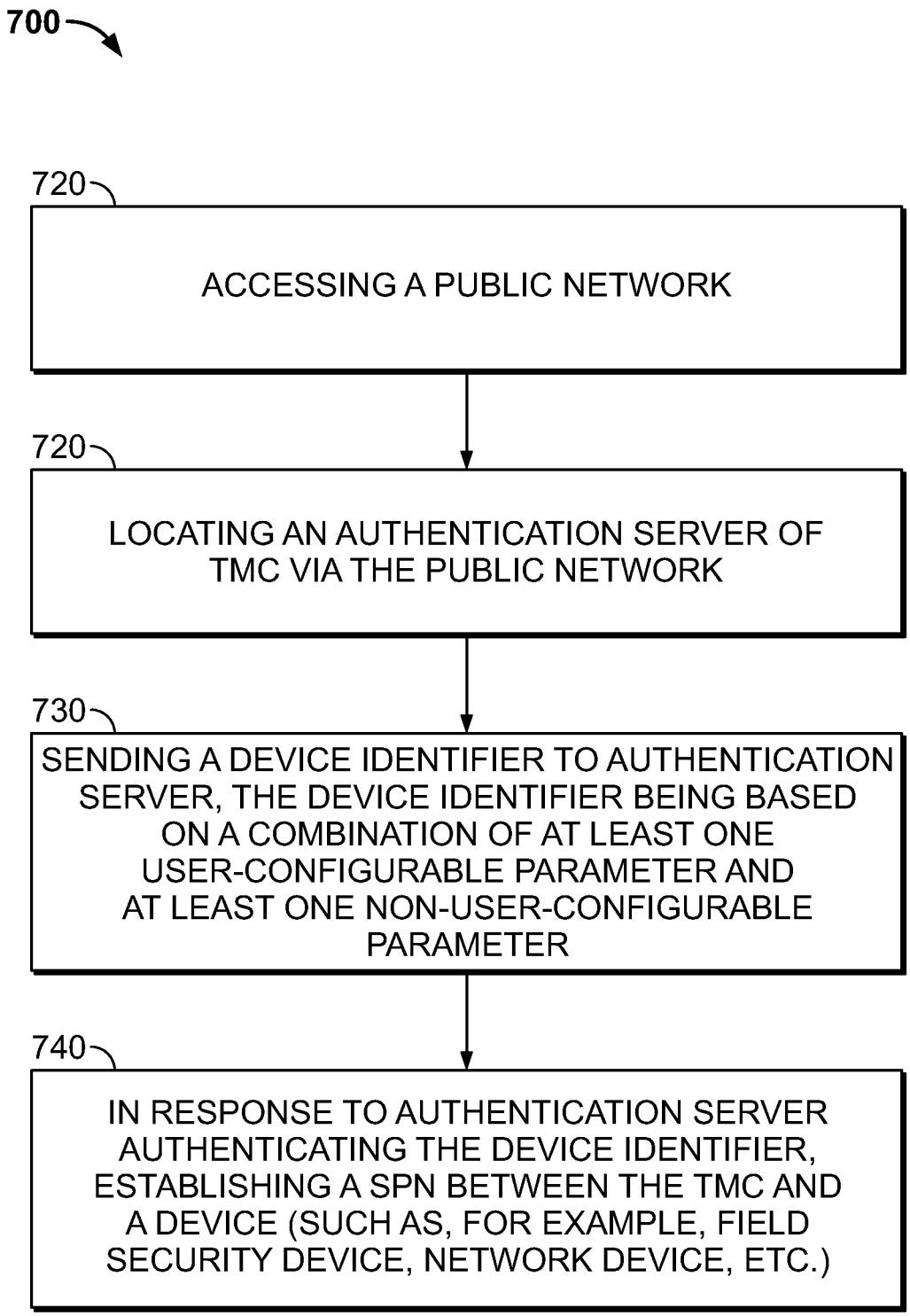
FIG. 7 shows one embodiment of a method for providing a SPN between a TMC and a device (e.g., a field security device, a network device, etc.).

Methods for Secured Communication:

In accordance with one or more aspects of the embodiments described herein, FIG. 7 illustrates an exemplary method 700 for providing a SPN between a device (e.g., a field security apparatus/device, a network device, etc.) and a TMC that may involve steps 710-740 described below. At step 710, the method 700 may involve accessing a public network. An authentication server of the TMC may be located via the public network (step 720). Method 700 may involve sending a device identifier for the device to the authentication server via the communication module, the device identifier being based on a combination of at least one user-configurable parameter and at least one non-user-configurable parameter of the device (step 730). At step 740, in response to the authentication server authenticating the device identifier, the SPN may be established between the TMC and the device. The established SPN may tunnel across one or more segments of the public network. In one approach, step 740 may comprise establishing the SPN between the TMC and a field security apparatus/device. In the alternative, or in addition, step 740 may comprise establishing the SPN between the TMC and a network device.

Figure 8:
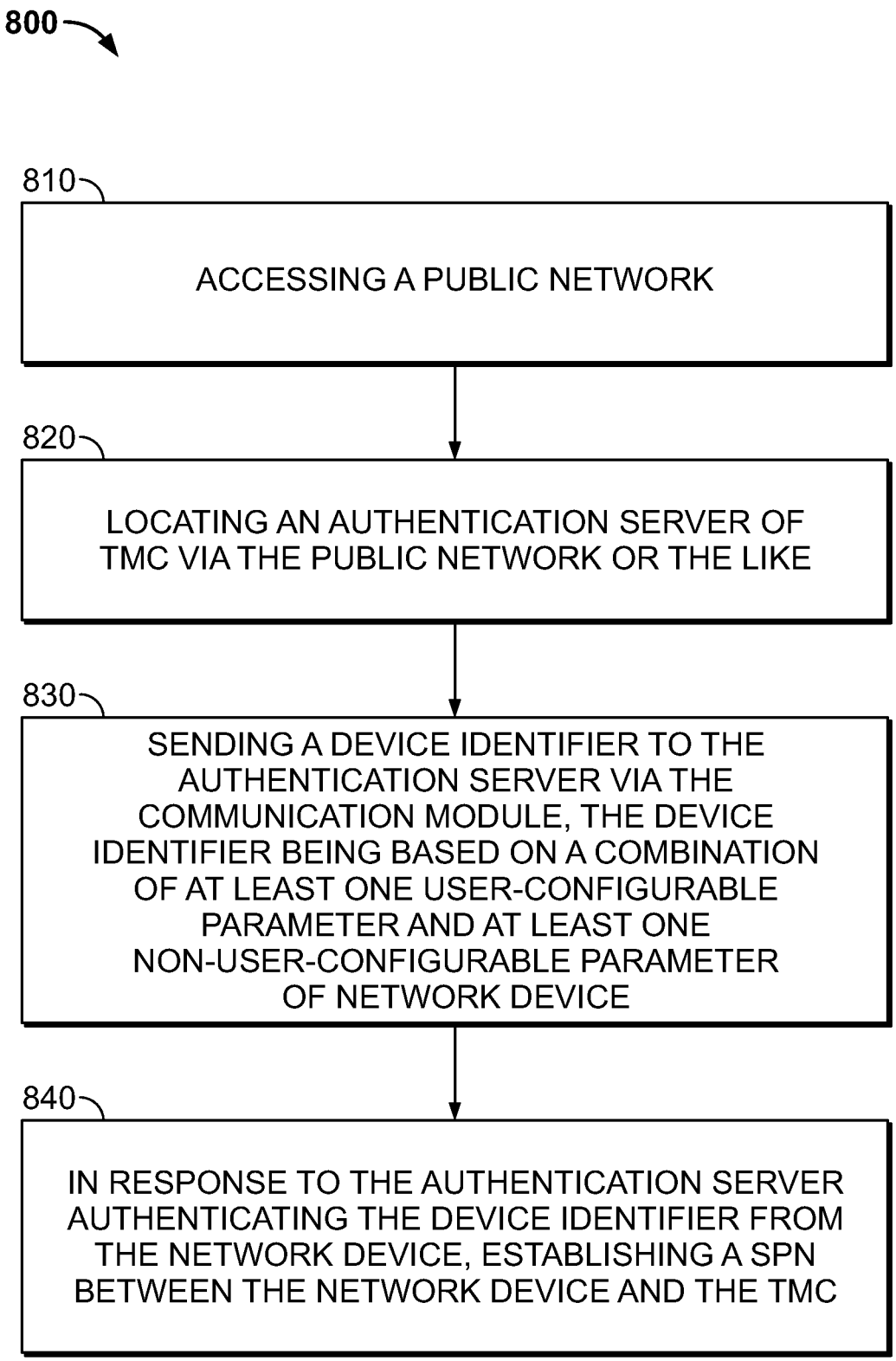
FIG. 8 shows one embodiment of a method for securely communicating with a TMC.

In accordance with one or more aspects of the embodiments described herein, FIG. 8 illustrates an exemplary method 800 for securely communicating with a TMC that may involve steps 810-840 described below. At step 810, method 800 may involve accessing a public network (e.g., via a communication module or the like). An authentication server of the TMC may be located via the public network or the like (step 820). Method 800 may involve sending a device identifier to the authentication server via the communication module, the device identifier being based on a combination of at least one user-configurable parameter and at least one non-user-configurable parameter of the network device (step 830). At step 840, in response to the authentication server authenticating the device identifier from the network device, method 800 may involve establishing a SPN between the network device and the TMC.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A field security device for providing a secure private network (SPN) between a field traffic controller and a traffic management center (TMC), comprising:
   a first connector for interfacing with the field traffic controller;
   a communication module;
   at least one processor operatively coupled to the first connector and the communication module; and
   a memory module operatively coupled to the at least one processor and comprising executable code that when executed by the processor enables the processor to:
   access a public network via the communication module;
   locate an authentication server of the TMC via the public network;
   generate a device identifier from machine parameters of the field security device, the device identifier uniquely identifying the field security device, the machine parameters including at least one user-configurable parameter and at least one non-user-configurable parameter wherein the at least one non-user-configurable parameter comprises a data sector damage measurement of a storage device;
   send the device identifier to the authentication server via the communication module; and
   in response to the authentication server authenticating the device identifier from the field security device, establish the SPN between the field security device and the TMC, wherein the established SPN tunnels across at least one segment of the public network.

2. The field security device of claim 1, wherein the at least one non-user-configurable parameter comprises at least one of CPU ID, CPU model, CPU manufacturer, and CPU voltage for the field security device.

3. The field security device of claim 1, wherein the at least one user-configurable parameter comprises one of hard disk volume name, user name, device name, user password, and hard disk initialization date for the field security device.

4. The field security device of claim 1, wherein the device identifier is generated by utilizing at least one irreversible transformation of the at least one user-configurable parameter and the at least one non-user-configurable parameter of the field security device.

5. The field security device of claim 4, wherein the device identifier is generated by utilizing a cryptographic hash function on the at least one user-configurable parameter and the at least one non-user-configurable parameter of the field security device.

6. The field security device of claim 1, wherein the communication module is adapted for wireless communication.

7. The field security device of claim 1, wherein the public network comprises the Internet.

8. The field security device of claim 1, wherein the public network comprises a wireless communication network, the wireless communication network implementing at least one of CDMA and GSM standards.

9. The field security device of claim 1, wherein the public network comprises a wireless communication network, the wireless communication network implementing at least one of 802.11a, 802.11b, 802.11g, 802.11n, and 802.11p standards.

10. The field security device of claim 1, wherein the traffic controller comprises a traffic signal.

11. The field security device of claim 1, wherein the traffic controller comprises a surveillance camera.

12. The field security device of claim 1, wherein the traffic controller is housed in a field traffic cabinet.

13. The field security device of claim 1 further configured to detect attempted network intrusions, wherein the memory module when executed by the processor enables the processor to determine the MAC ID of the field traffic controller, relay the MAC ID to the TMC, and allow the field traffic controller to communicate with the TMC via the SPN only if the TMC has authenticated the MAC ID.

14. The field security device of claim 1 further configured to detect attempted network intrusions, wherein the memory module when executed by the processor enables the processor to determine the MAC ID of the field traffic controller, relay a derivation of the MAC ID to the TMC, and allow the field traffic controller to communicate with the TMC via the SPN only if the TMC has authenticated the derivation of the MAC ID.

15. The field security device of claim 1 further configured for mutual authentication with the TMC, wherein the memory module when executed by the processor enables the processor to receive a server device identifier from the authentication server, compare the received server device identifier to authorized server device identifiers, and establish the SPN in response to the received server device identifier matching one of the authorized server device identifiers.

16. An authentication server for providing a secure private network (SPN) between a traffic management center (TMC) and a field security device, the field security device being in operative communication with a field traffic controller, comprising:
a communication module adapted to receive a device identifier over a public network from the field security device;
at least one processor operatively coupled to the communication module; and
a memory module operatively coupled to the at least one processor and comprising executable code that when executed by the processor enables the processor to:
in response to the communication module receiving the device identifier from the field security device, (i) compare the received device identifier to authorized device identifiers stored in a database, each authorized device identifier corresponding to a known field security device; (ii) generate a server device identifier from machine parameters of the authentication server, the server device identifier uniquely identifying the authentication server, the machine parameters including at least one user-configurable parameter and at least one non-user-configurable parameter wherein the at least one non-user-configurable parameter comprises a data sector damage measurement of a storage device, and (iii) send the server device identifier to the field security device via the communication module for authentication of the server device identifier by the field security device; and
in response to the received device identifier matching one of the authorized device identifiers, and in response to authentication of the server device identifier by the field security device, establish the SPN between the field security device and the TMC, wherein the established SPN tunnels across at least one segment of the public network.

17. The server of claim 16, wherein the authentication server is located at the TMC.

18. The server of claim 16, wherein the communication module is adapted for wireless communication.

19. The server of claim 16, wherein the public network comprises the Internet.

20. A network device for securely communicating with a traffic management center (TMC), comprising:
a communication module adapted to access a public network;
at least one processor operatively coupled to the communication module; and
a memory module operatively coupled to the at least one processor and comprising executable code that when executed by the processor enables the processor to:
access the public network via the communication module;
locate an authentication server of the TMC via the public network;
generate a device identifier from machine parameters of the field security device, the device identifier uniquely identifying the field security device, the machine parameters including at least one user-configurable parameter and at least one non-user-configurable parameter wherein the at least one non-user-configurable parameter comprises a data sector damage measurement of a storage device;
send the device identifier to the authentication server via the communication module; and
in response to the authentication server authenticating the device identifier from the network device, establish a secure private network (SPN) between the network device and the TMC, wherein the established SPN tunnels across at least one segment of the public network.

21. The network device of claim 20, wherein the network device comprises one of a laptop computer or a mobile phone.

22. The network device of claim 20, wherein the at least one non-user-configurable parameter comprises at least one of CPU ID, CPU model, CPU manufacturer, and CPU voltage for the network device.

23. The network device of claim 20, wherein the at least one user-configurable parameter comprises one of hard disk volume name, user name, device name, user password, and hard disk initialization date for the network device.

24. The network device of claim 20, wherein the device identifier is generated by utilizing at least one irreversible transformation of the at least one user-configurable parameter and the at least one non-user-configurable parameter of the network device.

25. The network device of claim 24, wherein the device identifier is generated by utilizing a cryptographic hash function on the at least one user-configurable parameter and the at least one non-user-configurable parameter of the network device.

26. The network device of claim 20, wherein the communication module is adapted for wireless communication.

27. The network device of claim 20, wherein the public network comprises the Internet.

28. The network device of claim 20 wherein the executable code is executed by the processor in response to powering on the device.

29. A method for providing a secure private network (SPN) between a device and a traffic management center (TMC), comprising:
accessing a public network;
locating an authentication server of the TMC via the public network;
generating a device identifier from machine parameters of the device, the device identifier uniquely identifying the device, the machine parameters including at least one user-configurable parameter and at least one non-user-configurable parameter wherein the at least one non-user-configurable parameter comprises a data sector damage measurement of a storage device;
sending the device identifier to the authentication server via the communication module; and
in response to the authentication server authenticating the device identifier, establishing the SPN between the TMC and the device, wherein the established SPN tunnels across at least one segment of the public network.

30. The method of claim 29, wherein establishing the SPN comprises establishing the SPN between the TMC and a field security apparatus.

31. The method of claim 29, wherein establishing the SPN comprises establishing the SPN between the TMC and a network device.

32. The method of claim 29 wherein all steps of the method are performed by a processor executing software stored in memory on the device, in response to powering on the device.

* * * * *